Figure 1:
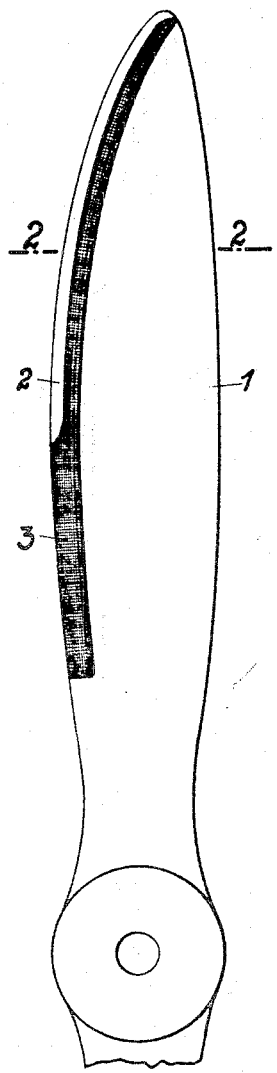

May 31, 1932.  H. SUKOHL  1,860,557

PROPELLER FOR AIRCRAFT

Filed Sept. 8, 1931

Inventor:

Heinrich Sukohl

Patented May 31, 1932

1,860,557

UNITED STATES PATENT OFFICE

HEINRICH SUKOHL, OF BERLIN-WAIDMANNSLUST, GERMANY, ASSIGNOR TO THE FIRM GUSTAV SCHWARZ G. M. B. H., OF BERLIN-WAIDMANNSLUST, GERMANY

PROPELLER FOR AIRCRAFT

Application filed September 8, 1931, Serial No. 561,725, and in Germany September 12, 1930.

My invention relates to improvements in propellers for air craft, and more particularly in propellers which are made from wood or other non-metallic material, and which are reinforced along the leading edges of their blades or wings for protecting the same from injury or destruction by stones, sand, or water impinging thereon. It has heretofore been proposed to reinforce the said edges by means of sheet metal strips. However, this construction is not satisfactory for the reason that the said sheet metal is not sufficiently pliable, so that it can not be applied close to the curved and rounded edge of the blade or wing, and, further, the holes for the screws or rivets needed for securing the sheet metal in position weaken the wood and permit the access of moisture thereto.

One of the objects of the improvements is to provide a propeller the blades or wings of which are provided at their leading edges with solid reinforcing matter which is closely applied to the surface of the blade. Another object is to provide a propeller in which the said reinforcing matter is applied without injuring the wooden body of the blade. With these objects in view my invention consists in applying reinforcing strips to the blades of the propeller which are composed each of a narrow solid portion following the leading edge of the blade, and pliable or flexible marginal portions engaging the marginal side faces of the blades and fixed thereto by being bound to the protective coating of the blade by means of a suitable binding medium. I have found that a reinforcing strip of this type fully protects the leading edge from injury, and that it is in close contact with the surface of the blade. Further, by reason of the pliable margins the reinforcing strip follows any deformation of the blade, so that it is not loosened even after long use.

For the purpose of explaining the invention several examples embodying the same have been shown in the accompanying drawings in which the same reference characters have been used in all the views to indicate corresponding parts. In said drawings, Fig. 1 is an elevation showing one of the blades or wings of the propeller, Fig. 2 is a partial sectional view on an enlarged scale taken on the line 2—2 of Fig. 1, Fig. 3 is a partial sectional view on a scale larger than the one shown in Fig. 2 and illustrating the manner of fixing the strip to the blade, Fig. 4 is a similar sectional view showing a modification, and Fig. 5 shows a development of the reinforcing strip used in the blade illustrated in Fig. 4.

Figure 2:
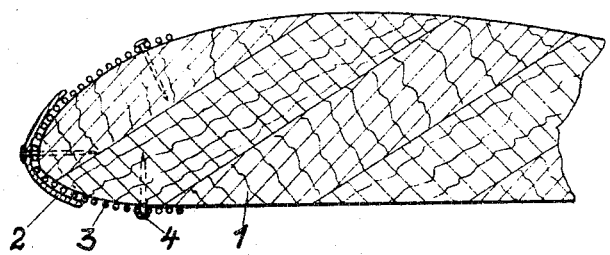
Figure 3:
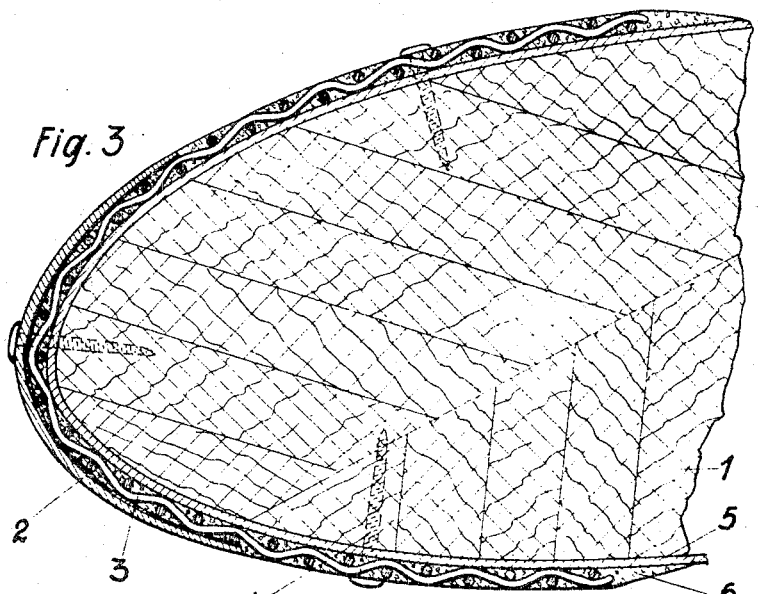

In the example shown in Figs. 1 to 3, the propeller blade 1 is made from wood, and it is reinforced at its leading edge by means of a strip of metal composed of a narrow strip 2 of sheet metal and a broader strip 3 of wire gauze or netting, the strip 2 being fixed to the outer surface of the strip 3 by soldering or welding. The breadth of the sheet metal strip 2 is such that it covers only the leading edge of the blade, while the wire gauze or netting 3 embraces the marginal portions of the side faces of the blade. The strip is preliminarily secured to the blade by means of short and thin pins or screws 4 which are passed into the wood to a small depth only, and it is finally fixed in position by means of a suitable binding medium or cement 6, for example a cement made from cellulose, such as viscose, cellulose acetate, nitrocellulose, celluloid, or the like, the binding medium being of a nature such that it combines with the protective coating 5. As is shown in Fig. 3 the said cement or binding medium 6 fills out the interstices of the wire gauze or netting 3, while it leaves the outer surface of the sheet metal strip 2 bare. By thus embedding the wire netting in the cement or binding medium 6 a smooth surface is obtained.

Figure 4:
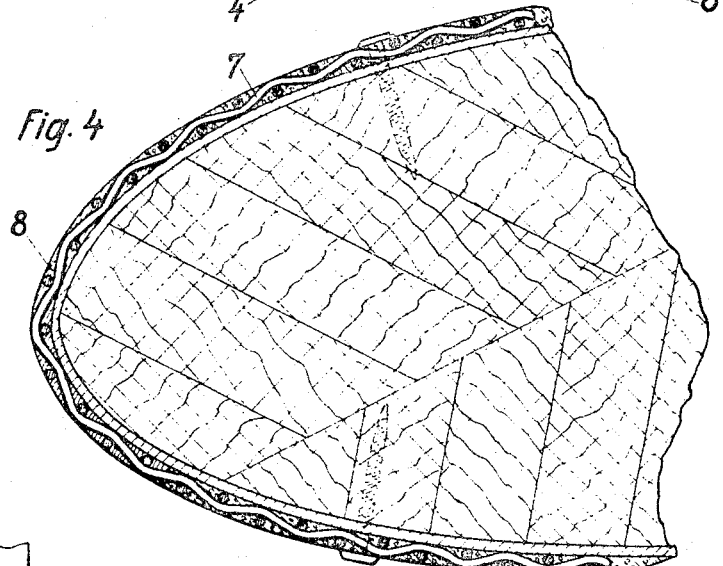
Figure 5:
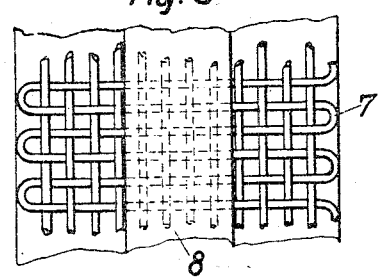

In the modification shown in Figs. 4 and 5 the reinforcing strip consists of a strip 7 of wire gauze or netting the meshes of which are filled out, at the middle of the strip covering the edge of the blade, by metal applied thereto by soldering or by electrolytic deposition, as is shown at 8. The manner of fixing the strip to the blade is the same as has been described with reference to Figs. 1 to 3.

I wish it to be understood that the manner of reinforcing propeller blades may be used in connection with any propellers which are made from a material which is softer than metal and which is subject to injury by stones, sand or water impinging thereon, such for example as propeller blades made from layers of fabric combined by a binding medium such as artificial resin, a binding medium made from cellulose, and the like. In the annexed claims the said blades will be described as non-metallic blades.

I claim:

1. A non-metallic propeller blade, and a reinforcing strip applied to the leading edge of said blade and having a solid portion covering a part of the leading edge of the blade and a pliable marginal portion covering the marginal portion of one of the side faces.

2. A non-metallic propeller blade, and a reinforcing strip applied to the leading edge of said blade and having a solid portion covering a part of the leading edge of the blade and pliable marginal portions embracing the marginal portion of one of the side faces.

3. A non-metallic propeller blade, and a reinforcing strip applied to the leading edge of said blade and having a solid portion covering a part of the leading edge of the blade and a pliable marginal portion covering the marginal portion of one of the side faces, said marginal portion of the strip being cemented to the side face of the blade.

4. A non-metallic propeller blade, and a reinforcing strip applied to the leading edge of said blade and having a solid portion covering a part of the leading edge of the blade and pliable marginal portions embracing the marginal portion of one of the side faces, said marginal portions of the strip being cemented to the side faces of the blade.

5. A non-metallic propeller blade, and a reinforcing strip applied to the leading edge of said blade and composed of a strip of wire netting or gauze fixed to and embracing the leading edge of said blade and the adjacent marginal portions thereof and a strip of sheet metal narrower than said strip of wire gauze or netting and covering a part of the leading edge of said blade and secured to the outside of said strip of wire gauze or netting.

6. A non-metallic propeller blade, and a reinforcing strip applied to the leading edge of said blade and composed of a strip of wire netting or gauze embracing the leading edge of said blade and the adjacent marginal portions thereof and fixed thereto by cement, and a strip of sheet metal narrower than said strip of wire gauze or netting and covering a part of the leading edge of said blade and secured to the outside of said strip of wire gauze or netting.

7. A non-metallic propeller blade, and a reinforcing strip applied to the leading edge of said blade and composed of a strip of wire netting or gauze fixed to and embracing the leading edge of said blade and the adjacent marginal portions thereof, the portion of said wire gauze or netting covering said edge having its meshes filled out with metal.

8. A non-metallic propeller blade, and a reinforcing strip applied to the leading edge of said blade and composed of a strip of wire netting or gauze embracing the leading edge of said blade and the adjacent marginal portions thereof and fixed thereto by cement, the portion of said wire gauze or netting covering said edge having its meshes filled out with metal.

In testimony whereof I hereunto affix my signature.

HEINRICH SUKOHL.